3,449,380
Patented June 10, 1969

3,449,380
3 HYDROXY-13-LOWER ALKYL-GONA-1,3,5(10)8,14-PENTAENE - 15 - CARBALKOXY - 17 - ONE COMPOUNDS AND PROCESS FOR THE PRODUCTION THEREOF
Chan Hwa Kuo, South Plainfield, David Taub, Metuchen, and Norman L. Wendler, Summit, N.J., assignors to Merck & Co., Inc., Rahway, N.J., a corporation of New Jersey
No Drawing. Filed May 14, 1965, Ser. No. 455,992
Int. Cl. C07c *171/00, 171/07;* A61k *17/00*
U.S. Cl. 260—397.1          6 Claims

ABSTRACT OF THE DISCLOSURE

The invention disclosed herein is concerned generally with novel intermediate compounds useful in preparing novel steroid compounds, the novel steroid compounds prepared from the novel intermediate compounds, and novel processes for preparing intermediate and steroid compounds.

---

More particularly, it relates to intermediates useful in the preparation of steroids of the estrane series which are themselves useful for producing 3-hydroxy or substituted oxy-gona or D-homogona-1,3,5(10)-trien-17-one or 17a-one steroids which may have a lower alkyl substituent at C-13. These compounds are prepared, for example, by condensing carbalkoxy-2-alkyl-cyclopentane-1,3-dione with 1-vinyl-1-methoxy-6-hydroxy-1,2,3,4-tetrahydronaphthalene to form 3-methoxy-8,14-secogona-1,3,5(10), 9(11)-tetraene-14,17-dione, which is then converted by reaction with acid to 3-methoxy-15-carbalkoxy-13-alkyl-1,3,5(10),8,14-pentaene-17-one; hydrogenation followed by basic saponification of the ester at C–15 and decarboxylation of the resulting 15-carboxylic acid by heating with acid produces the corresponding 3-methoxy-3-alkyl-1,3,5 (10)-triene-17-one such as estrone methyl ether. The latter compounds are physiologically active substances possessing estrogenic activity, and also have utility as intermediates for the total synthesis of 19-nor steroids.

More particularly, this invention relates to the condensation of a 1-vinyl-1-hydroxy-6-hydroxy, lower alkoxy or aralkoxy-1,2,3,4-tetrahydronaphthalene compound, which may be chemically represented as follows:

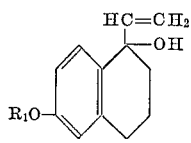

wherein $R_1$ is hydrogen, lower alkyl or aralkyl, with a 2-lower alkyl-1,3-dicarbonyl alicyclic compound or a 2-lower alkyl-1,3,-dicarbonyl-4-carbalkoxy, carbaralkoxy or carboxamido alicyclic compound, which may be chemically represented as follows:

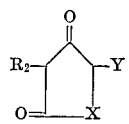

wherein $R_2$ is hydrogen, or lower alkyl, Y is hydrogen, carbalkoxy, carbaralkoxy or carboxamido, and X is methylene or ethylene, Y being hydrogen if X is ethylene, to produce 3-hydroxy or substituted oxy-8,14-seco-gona-tetraene-14,17-dione or D-homogonatetraene-14,17a-dione compounds such as 3-hydroxy, lower alkoxy or aralkoxy-8,14 - seco-13-lower alkyl-gona-1,3,5(10),9(11)-tetraene-14,17-dione compounds, 3-hydroxy, lower alkoxy or aralkoxy - 8,14-seco-13-lower alkyl-gona-1,3,5(10),9(11)-tetraene-15-carbalkoxy, carbaralkoxy or carboxamido-14,17-dione compounds, or 3-hydroxy, lower alkoxy or aralkoxy-8,14 - seco - 13-lower alkyl-p-homogona-1,3,5(10),9(11)-tetraene-14,17a-dione compounds, which may be chemically presented as follows:

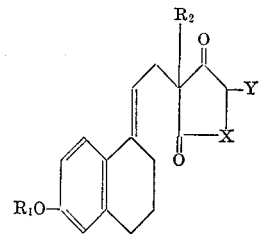

wherein $R_1$ is hydrogen, lower alkyl or aralkyl, $R_2$ is hydrogen or lower alkyl, Y is hydrogen, carbalkoxy, carbaralkoxy or carboxamido, X is methylene or ethylene, Y being hydrogen if X is ethylene.

This invention also relates to a process for producing directly from the condensation of a 1-vinyl-1-hydroxy-6-hydroxy, lower alkoxy or aralkoxy-1,2,3,4-tetrahydronaphthalene compound with a 2-lower alkyl-1,3,-dicarbonyl alicyclic compound or a 2-lower alkyl-1,3,-dicarbonyl-4-carbalkoxy, carbaralkoxy or carboxamido alicyclic compound or by ring closure and dehydration of 3-hydroxy- or substituted oxy-8,14-seco-gona- or D-homogonatetraene-14,17 or 14,17a-dione compounds; 3-hydroxy or substituted oxy-gona- or D-homogonapentaene-17 or 17a-one steroids such as 3-hydroxy, lower alkoxy or aralkoxy-13-lower alkyl - gona - 1,3,5(10),8,14-pentaene-17-one compounds, 3-hydroxy, lower alkoxy or aralkoxy-13-lower alkyl-gona-1,3,5(10),8,14-pentaene-15-carbalkoxy, carbaralkoxy or carboxamido-17-one compounds and 3-hydroxy, lower alkoxy or aralkoxy-D-homogona-1,3,5(10),8,14-pentaene-13-lower alkyl-17a-one compounds. The 3-hydroxy or substituted oxy-gona- or D-homogonapentaen-17 or 17a-one steroids produced directly or by ring closure and dehydration may be chemically represented as follows:

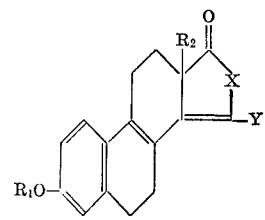

in which $R_1$ is hydrogen, lower alkyl or aralkyl, $R_2$ is hydrogen or lower alkyl, X is methylene or ethylene, and Y is hydrogen, carbalkoxy, carbaralkoxy or carboxamido, Y being hydrogen if X is ethylene.

The novel compounds of this invention, more particularly, the 3-hydroxy, lower alkoxy or aralkoxy-8,14-seco-13-hydro or lower alkyl-gona-1,3,5(10),9(11)-tetraen-14-17-dione compounds, the 3-hydroxy, lower alkoxy or aralkoxy-13-hydro or lower alkyl-gona-1,3,5(10),8,14-pentaen-17-one compounds, the 3-hydroxy, lower alkoxy or aralkoxy-13-hydro or lower alkyl-gona-1,3,5(10),8-tetraen-17-one compounds, and 3-hydroxy, lower alkoxy or aralkoxy-13-hydro or lower alkyl-gona-1,3,5(10)-trien-17-one compounds, all of which are substituted in the 15-position with a carbalkoxy, carbaralkoxy, carboxamido or carboxyl group, are respectively represented by the following chemical formulae:

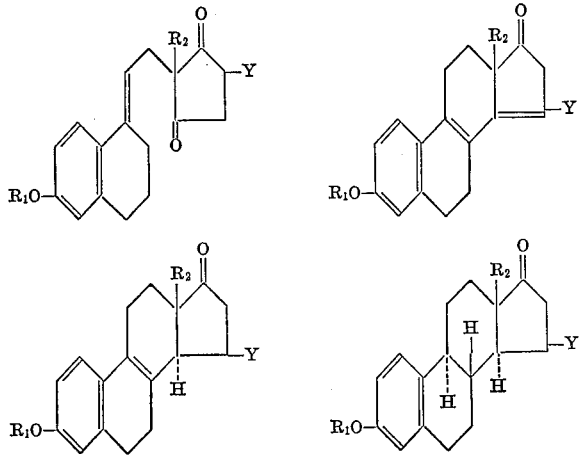

in which $R_1$ is hydrogen, lower alkyl or aralkyl, $R_2$ is hydrogen or lower alkyl, and Y is carbalkoxy, carbaralkoxy, carboxamido or carboxy.

The novel compounds of this invention have utility as intermediates in the preparation of novel 3-hydroxy or substituted oxy-gona- or D-homogona-1,3,5(10)-trien-17-one or 17a-one steroids which are physiologically active substances possessing estrogenic activity, and also have utility as intermediates useful in the total synthesis of 19-nor steroids according to known procedures.

Heretofore, the condensation of a bis-vinyl carbinol, such as 1-vinyl-1-hydroxy-6-methoxy-1,2,3,4-tetrahydronaphthalene with a cyclic 1,3-dione compound such as cyclopentanedione-1,3 2-alkylcyclopentanedione-1,3 or 2-alkylcyclohexanedione-1,3 has been considered a base catalyzed reaction and has been conducted in the presence of a base, such as benzyl trimethylammonium hydroxide. The condensation as heretofore carried out has provided a relatively low yield of the desired 8,14-secogona-1,3,5(10),9(11)-tetraene-14,17-dione condensation product. One investigator stated that the condensation did not take place under acidic conditions.

It has now been discovered that the condensation of a bis-vinyl carbinol, such as 1-vinyl-1-hydroxy-6-methoxy-1,2,3,4-tetrahydronaphthalene, with a cyclic 1,3-dione compound, such as cyclopentanedione-1,3, 2-alkylcyclopentanedione-1,3, or 2-alkylcyclohexanedione-1,3, proceeds readily if the reaction mixture is acidic, preferably at a pH of from about 3 to about 6, and provides a high yield of the desired 8,14-seco-gona-1,3,5(10),9(11)-tetraene-14,17-dione condensation product. An additional advantage of conducting the condensation under acid conditions is that a 4-carbalkoxy, carbaralkoxy or carboxamido-cyclopentanedione-1,3 may be reacted with a bis-vinyl carbinol, such as 1-vinyl-1-hydroxy-6-methoxy-1,2,3,4-tetrahydronaphthalene to provide a 8,14-secogona-1,3,5(10),9(11)-tetraene-15-carbalkoxy, carbaralkoxy or carboxamido-14,17-dione condensation product. If this reaction is conducted under basic conditions a carbalkoxy, carbaralkoxy or carboxamido may undergo partial saponification to the free acid and some decarboxylation may then take place.

It has also been discovered that by the use of a lower aliphatic acid, preferably acetic acid, with or without the presence of a hydrocarbon, such as benzene, toluene or xylene, as a solvent, the condensation of a bis-vinyl carbinol and a cyclic 1,3-dione compound proceeds in one step and in good yields through the 8,14-secogona-1,3, 5(10),9(11)-tetraene-14,17-dione condensation product to the gona-1,3,5(10),8,14-pentaene-17-one which results from ring closure and loss of one molecule of water from the condensation product. By the one-step condensation, improved yields of the gona-1,3,5(10),8,14-pentaene-17-one compounds are obtained and at substantially lower costs because of savings in time and materials.

It has been additionally discovered that cyclic 1,3-diones, such as cyclopentanedione-1,3, 2-alkylcyclopentanedione-1,3, 2-alkylcyclohexanedione-1,3, and 4-carbalkoxy, carbaralkoxy, and carboxamidocyclopentanedione-1,3, which provide an acidic reaction mixture having a pH within the range of 3 to 6, with a bis-vinyl carbinol may be reacted with a bis-vinyl carbinol in the absence of additional acid and with or without a solvent to provide excellent yields of 8,14-secogona-1,3,5(10),9(11)-tetraene-14,17-dione compounds.

The novel 3-hydroxy or substituted oxy-8,14-secogona- or D-homogonatetraene-14,17 or 14,17a-dione compounds are prepared by condensing in the absence of a solvent or in a suitable solvent, more particularly, a lower aliphatic alcohol, such as methanol, ethanol, propanol or tertiary-butanol, or a mixture of a lower aliphatic alcohol and an aromatic hydrocarbon, such as benzene, toluene or xylene, a 1-vinyl-1-hydroxy-6-hydroxy, lower alkoxy or aralkoxy-1,2,3,4-tetrahydronaphthalene compound, such as 1-vinyl-1-hydroxy-6-methoxy-1,2,3,4-tetrahydronaphthalene, with a 2-lower alkyl-1,3-dicarbonyl alicyclic compound which may have a carbalkoxy, carbaralkoxy or carboxamido group in the 4-position, such as 2-methylcyclopentane-1,3-dione,
2-methyl-4-carbomethoxycyclopentane-1,3-dione,
2-methyl-4-carboxamidocyclopentane-1,3-dione,
2-methyl-4-carbophenoxycyclopentane-1,3-dione, and
2-methylcyclohexane-1,3-dione to form novel 3-hydroxy or substituted oxy-8,14-secogona- or D-homogonatetraene-14,17a-dione compounds, more particularly, 3-methoxy-8,14 - seco - estra - 1,3,5(10),9(11) - tetraene-14,17-dione,
3-benzyloxy-8-14-seco - estra - 1,3,5(10),9(11) - tetraene-14,17-dione,
3-methoxy-8,14-seco - 15 - carbethoxy - estra - 1,3,5(10), 9(11)-tetraene-14,17-dione,
3-methoxy-8,14-seco - 15 - carboxamido - estra-1,3,5(10), 9(11)-tetraene-14,17-dione,
3-methoxy-8,14-seco-13 - ethyl - gona - 1,3,5(10),9(11)-tetraene-14,17-dione,
3-benzyloxy-8,14-seco-13-ethyl - gona - 1,3,5(10),9(11)-tetraene-14,17-dione,
3-methoxy-8-14-seco - 13 - ethyl-15-carbethoxy-gona-1,3, 5(10),9(11)-tetraene-14,17-dione,
3-methoxy-8,14-seco-13-ethyl - 15 - carboxamido - 1,3,5-(10),9(11)-tetraene-14,17-dione,
3-benzyloxy-8,14-seco-13 - ethyl-15-carbethoxy-gona-1,3, 5(10),9(11)-tetraene-14,17-dione,
3-benzyloxy-8,14-seco-13 - ethyl-15 - carboxamido-gona-1, 3,5(10),9(11)-tetraene-14,17-dione,
3-methoxy-8,14-seco - D - homoestra-1,3,5(10),9(11)-tetraene-14,17a-dione,
3-benzyloxy-8,14-seco-D-homoestra - 1,3,5(10),9(11)-tetraene-14,17-dione,
3-methoxy-8,14-seco-13 - ethyl-D-homogona - 1,3,5(10), 9(11)-tetraene-14,17a-dione,
3-benzyloxy - 8,14 - seco-13-ethyl-D-homogona-1,3,5(10), 9(11)-tetraene-14,17a-dione, and the like The novel 3-hydroxy or substituted oxy-gona or D-homogonapentaen-17 or 17a-one steroids, more particularly, 3-methoxy-estra-1,3,5(10),8,14-pentaen-17-one,
3-benzyloxy-estra-1,3,5(10),8,14-pentaen-17-one,
3-methoxy-15-carbethoxy - estra - 1,3,5(10),8,14-pentaen-17-one,
3-methoxy - 15 - carboxamido-estra - 1,3,5(10),8,14-pentaen-17-one,
3-methoxy-13-ethyl-gona-1,3,5(10),8,14-pentaen-17-one, 3-benzyloxy-13-ethyl-gona - 1,3,5(10),8,14 - pentaen-17-one
3-methoxy-13-ethyl-15 - carbethoxy-gona-1,3,5(10),8,14-pentaen-17-one,
3-benzyloxy-13-ethyl-15-carbethoxy - gona-1,3,5(10),8,14-pentaen-17-one,
3-benzyloxy-13-ethyl-15-carboxamido - gona-1,3,5(10),8,14-pentaen-17-one,
3-methoxy-D-homoestra-1,3,5(10),8,14-pentaen-17a-one,
3-benzyloxy-D-homoestra - 1,3,5(10),8,10-pentaen - 17a-one,
3-methoxy-13 - ethyl - D - homogona-1,3,5(10),8,14-pentaen-17a-one,
3-benzyloxy-13-ethyl-D-homogona - 1,3,5(10),8,14 - pentaen-17a-one, and the like, are produced by ring closure and removal of a molecule of water from 3-hydroxy or substituted oxy-8,14-seco-gona- or D-homogonatetraene-14,17 or 14,17a-dione compounds, such as those listed in the paragraph above. A variety of solvents and reagents may be used to carry out this conversion, more particularly, the 3-hydroxy or substituted oxy-8,14-seco-gona- or D-homogona-tetraene-14,17 or 14,17a-dione compound is allowed to stand at room temperature in solution in a lower aliphatic alcohol, such as ethanol or propanol, which contains hydrochloric acid; in solution in benzene which contains an aromatic sulfonic acid, such as para-toluenesulfonic acid; in solution in glacial acetic acid; in solution in a hydrocarbon solvent such as benzene, toluene or xylene which contains glacial acetic acid; or in solution in dioxane or tetrahydrofuran which contains aqueous hydrochloric acid.

The novel 3-hydroxy or substituted oxy-gona or D-homogonapentaene-17 or 17a-one steroids may also be prepared in one step by refluxing a solution in a lower aliphatic acid, preferably acetic acid or by reacting a solution in a lower aliphatic acid and a hydrocarbon, such as benzene, toluene or xylene, of a 1-vinyl-1-hydroxy-6-hydroxy, lower alkoxy or aralkoxy-1,2,3,4-tetrahydronaphthalene compound with a 2-lower alkyl-1,3-dicarbonyl alicyclic compound, which may have a carbalkoxy, carbaralkoxy or a carboxamido group in the 4-position.

The reaction between a 1-vinyl-1-hydroxy-6-hydroxy, lower alkyl or aralkoxy-1,2,3,4-tetrahydronaphthalene compound with a 2-lower alkyl-1,3-dicarbonyl-alicyclic compound or a 2-lower alkyl-1,3-dicarbonyl-4-carbalkoxy, carbaralkoxy or carboxamido alicyclic compound to provide 3-hydroxy or substituted oxy-8,14-secogona or D-homogonatetraene-14,17 or 14,17a-dione compounds is conveniently conducted by reacting substantially equimolar amounts of the two reactant compounds in a polar solvent, such as methanol, ethanol, tertiary-butanol, or a mixed solvent such as methanol, ethanol or tertiary-butanol and an aromatic hydrocarbon, such as benzene, toluene or xylene, at a temperature within the range of from about room temperature to 140° C., cooling the reaction mixture, concentrating under vacuum, adding a non-polar organic solvent, such as ether, to precipitate unreacted dicarbonyl alicyclic compound, removing the unreacted dicarbonyl alicyclic compound by filtration, washing the precipitate with ether, combining the ether wash with the original filtrate, washing the combined ether solution with an aqueous solution of a weak base, such as potassium bicarbonate, drying the ether solution, and concentrating the ether solution to dryness, preferably under vacuum, to give a 3-hydroxy or substituted oxy-8,14-seco-gona- or D-homogonatetraene-14,17 or 14,17a-dione compound, which may be purified, if desired by crystallization from a suitable solvent, such as an ether-hexane mixture.

The treatment of a 3-hydroxy or substituted oxy-8,14-seco-gona- or D-homogonatetraene-14,17 or 14,17a-dione compound to bring about cyclization and the elimination of one molecule of water to form 3-hydroxy or substituted oxy-gona- or D-homogonapentaene-17 or 17a-one steroids is conveniently conducted by keeping a solution of the 3-hydroxy or substituted oxy-8,14-seco-gona- or D-homogonatetraene-14,17a-dione compound in ethanol in the presence of hydrochloric acid at a temperature of from about 20° C. to about 50° C., or by refluxing a solution of the compound in an inert solvent, such as benzene, in the presence of para-toluenesulfonic acid in a container adapted to remove water as formed, such as a flask with a reflux condenser fitted with a water separator. The solution is then cooled, washed with a basic solution, such as an aqueous sodium carbonate solution, and filtered. The solvent is removed by distillation and the product may be purified, if desired, by recrystallization from a suitable solvent, such as ethyl acetate, or methanol.

The reaction between a 1-vinyl-1-hydroxy-6-hydroxy, lower alkoxy or aralkoxy-1,2,3,4-tetrahydronaphthalene compound and a 2-lower alkyl-1,3-dicarbonyl alicyclic compound or a 2-lower alkyl-1,3-dicarbonyl-4-carbalkoxy, carbaralkoxy or carboxamido alicyclic compound to form a 3-hydroxy or substituted oxy-gona or D-homogonapentaene-17 or 17a-one steroid is conveniently conducted by refluxing a solution of substantially equimolar amounts of the two reactants and a weak acid such as acetic acid or propionic acid in an inert solvent such as xylene, benzene, or dioxane. The reaction is preferably conducted in an inert atmosphere, preferably in an atmosphere of nitrogen. The solution is cooled and filtered to remove any precipitated unreacted 2-lower alkyl-1,3-dicarbonyl alicyclic compound or 2-lower alkyl-1,3-dicarbonyl-4-carbalkoxy, carbaralkoxy or carboxamido alicyclic compound. The precipitate unreacted compound is washed with ether and the ether wash is combined with the filtrate. The combined solution is washed with an aqueous solution of a weak alkali, such as potassium bicarbonate, and the washed solution is dried and evaporated to dryness. The resulting product may be purified, if desired, by crystallization from a suitable solvent, such as ether-petroleum ether.

The 3-hydroxy or substituted oxy-gona, or D-homogonapentaen-17 or 17a-one steroids produced according to the processes of this invention, more particularly, the 3-hydroxy, lower alkoxy or aralkoxy, 13-lower alkyl-gona-1,3,(10),8,14-pentaen-17-one compounds, 3-hydroxy, lower alkoxy or aralkoxy-13-lower alkyl-15-carbalkoxy, carbaralkoxy or carboxamido-gona-1,3,5(10),8,14-pentaen-17-one compounds, and 3-hydroxy, lower alkoxy or aralkoxy-13-lower alkyl-D-homogona-1,3,5(10),8,14-pentaen-17a-one compounds, may be selectively hydrogenated at the $\Delta^{14}$ double bond by shaking a solution thereof in an organic solvent containing a catalyst with hydrogen, more particularly, a hydrocarbon solvent, such as benzene, toluene or xylene, containing a catalyst, such as 2% pallidised calcium carbonate, until the theoretically required amount of hydrogen has been adsorbed, to afford a high yield of the corresponding 1,3,5(10),8 tetraene compound with a 14α-hydrogen, such as 3-hydroxy, lower alkoxy or aralkoxy-13-lower alkyl-gona-1,3,5(10),8-tetraen-17-one compounds, 3-hydroxy, lower alkoxy or aralkoxy-13-lower alkyl-15-carbalkoxy, carbaralkoxy or carboxamido-gona-1,3,5,(10),8-tetraen-17-one compounds, and 3-hydroxy, lower alkoxy or aralkoxy-13-lower alkyl D-homogona-1,3,5(10),8-tetraen-17a-one compounds.

The latter 1,3,5(10),8-tetraene compounds with a 14α-hydrogen may be selectively reduced at the $\Delta^8$ double bond by adding a solution thereof in a suitable solvent, such as dioxane, or tetrahydrofuran, to a solution of potassium in liquid ammonia, adding ammonium acetate and water, and extracting with ether, to afford a good yield of the corresponding 1,3,5(10)-triene compound having 8β,9α,13α hydrogens, more particularly, 3-hydroxy, lower alkoxy or aralkoxy-13-lower alkyl-gona-1,3,5(10)-trien-17-one compounds, 3-hydroxy, lower alkoxy or aralkoxy-13-lower alkyl-15-carbalkoxy, carbaralkoxy or carboxamido-gona-1,3,5(10)-trien-17-one compounds, and 3-hydroxy, lower alkoxy or aralkoxy-13-lower alkyl-D-homogona-1,3,5(10)-trien-17a-one compounds.

The carbalkoxy, carbaralkoxy or carboxamido groups of the novel compounds of the invention, more particularly, the 3-hydroxy, lower alkoxy or aralkoxy-13-hydro or lower alkyl-15-carbalkoxy, carbaralkoxy or carboxamido-8,14-seco-gona-1,3,5(10),9(11) - tetraene-14,17-dione compounds, the 3-hydroxy, lower alkoxy or aralkoxy-13-hydro or lower alkyl-15-carbalkoxy, carbaralkoxy or carboxamido-gona-1,3,5(10),8,14-pentaen - 17 - one compounds, the 3-hydroxy, lower alkoxy or aralkoxy-hydro or lower alkyl-15-carbalkoxy, carbaralkoxy or carboxamido-gona-1,3,5(10),9-tetraen-17-one compounds, and the 3-hydroxy, lower alkoxy or aralkoxy-13-hydro or lower alkyl-15-carbalkoxy, carbaralkoxy, or carboxamido-gona-1,3,5(10)-trien-17-one compounds, may be readily converted to a carboxy group by saponification with a weak base, such as barium hydroxide, saponification may be accomplished by refluxing under nitrogen a solution of the compound to be saponified in a lower aliphatic alcohol, preferably methanol or ethanol, which contains the weak base and as much water as can be present and still permit the compound to be saponified to be in solution. When the saponification is complete, the reaction mixture is cooled and an acid, such as hydrochloric acid, in an amount sufficient to react with all the base used in the reaction, is added. The reaction product is extracted from the reaction mixture with ether.

Any 15-carboxy compound obtained by saponification of a 15-carbalkoxy, carbaralkoxy or carboxamido compound as described above, may be resolved by combining with a suitable alkaloid base, such as brucine, strychnine, quinine or cinchonine, and separating the enantiamorphs according to conventional procedures, followed by converting the alkaloid base-steroid combination product into the free acid and free base, and separating and recovering the steroid from the alkaloid base.

Any 15-carboxy compound described above may be decarboxylated by warming a solution, preferably under nitrogen, of the 15-carboxy compound in a lower aliphatic acid, such as acetic acid, containing a small amount of a strong acid, such as hydrochloric acid. After decarboxylation is a complete, water is added to the reaction mixture and the decarboxylated product may be recovered by extraction with a suitable solvent, such as ether.

The following examples illustrate methods of carrying out the present invention but it is to be understood the examples are given by way of illustration and not to limit the invention.

EXAMPLE 1.—3-methoxy-8,14-seco-13-methyl-gona-1,3,5(10),9(11)-tetraene-14,17-dione A mixture of 700 mg. of 1-vinyl-1-hydroxy-6-methoxy-1,2,3,4-tetrahydronaphthalene and 800 mg. of 2-methylcyclopentanedione-1,3, in four ml. of xylene and two ml. of tertiary-butanol is refluxed for 90 minutes. The mixture is cooled and concentrated to dryness under reduced pressure. Twenty ml. of ether are added to the residue and 115 mg. of insoluble 2-methylcyclopentanedione-1,3 are removed by filtration. The filtrate is washed with 5% aqueous sodium bicarbonate solution, dried over magnesium sulfate, and concentrated to dryness under reduced pressure. Crystallization of the residue from a solution of ether and hexane gives 515 mg. of 3-methoxy-8,14-seco-13 - methyl - gona - 1,3,5(10),9(11) - tetraene - 14,17 - dione, M.P. 76–78° C.

EXAMPLE 2.—3-methoxy-8,14-seco-13-methyl-gona-1,3,5(10),9(11)-tetraene-14,17-dione A mixture of 700 mg. of 1-vinyl-1-hydroxy-6-methoxy-1,2,3,4-tetrahydronaphthalene and 800 mg. of 2-methylcyclopentanedione-1,3 in six ml. of tertiary-butanol is refluxed for eighteen hours. The mixture is cooled and concentrated to dryness under reduced pressure. Twenty ml. of ether are added and the insoluble 2-methyl-cyclopentanedione-1,3 is removed by filtration. The filtrate is washed with 5% aqueous sodium bicarbonate solution, dried over magnesium sulfate, and concentrated to dryness under reduced pressure. The residue is crystallized from a solution of ether and hexane. 495 mg. of 3-methoxy - 8,14 - seco - 13 - methyl - gona - 1,3,5(10),9(11)-tetraene-14,17-dione, M.P. 76–78° C. are obtained.

EXAMPLE 3.—3-methoxy-8,14-seco-13-ethyl-gona-1,3,5(10),9(11)-tetraene-14,17-dione A mixture of 610 mg. of 1-vinyl-1-hydroxy-6-methoxy-1,2,3,4-tetrahydronaphthalene and 380 mg. of 2-ethylcyclopentane-1,3-dione in four ml. of xylene and two ml. of ethanol is refluxed for three hours. The mixture is cooled and concentrated to dryness under reduced pressure. Twenty ml. of ether are added and the insoluble 2-ethylcyclopentane-1,3-dione is removed by filtration. The ether solution is washed with 5% aqueous sodium bicarbonate solution dried over magnesium sulfate, and concentrated to dryness under reduced pressure. The residue is 3-methoxy - 8,14 - seco - 13 - ethyl - gona - 1,3,5(10),9(11)-tetraene-14,17-dione and is crystallized from a solution of ether and hexane.

EXAMPLE 4.—3 - methoxy - 8,14 - seco - 13 - methyl-D - homogona - 1,3,5(10),9(11) - tetraene - 14,17a-dione A mixture of 600 mg. of 1-vinyl-1-hydroxy-6-methoxy-1,2,3,4-tetrahydronaphthalene and 375 mg. of 2-methylcyclohexanedione-1,3 in four ml. of xylene and two ml. of tertiary-butanol is refluxed for two hours. The mixture is cooled and concentrated to dryness under reduced pressure. Twenty ml. of ether are added and the insoluble 3-methyl-cyclohexanedione-1,3 is removed by filtration. The filtrate is washed with 5% aqueous sodium bicarbonate solution, dried over magneisum sulfate, and concentrated to dryness under reduced pressure. The residue is 3 - methoxy - 8,14 - seco - 13 - methyl - D - homogona-1,3,5(10),9(11)-tetraene-14,17a-dione and is crystallized from a solution of ether and hexane.

EXAMPLE 5.—3-benzyloxy-8,14-seco-13-methyl-gona-1,3,5(10),9(11)-tetraene-14,17-dione A mixture of 560 mg. of 1-vinyl-1-hydroxy-6-benzyloxy-1,2,3,4-tetrahydronaphthalene and 225 mg. of 2-methylcyclopentanedione-1,3 in a mixture of three ml. of toluene and three ml. of ethanol is refluxed for six hours. The mixture is cooled and concentrated to dryness under reduced pressure. Twenty ml. of ether are added and the insoluble 2-methylcyclopentanedione-1,3 is removed by filtration. The filtrate is washed with 5% aqueous sodium bicarbonate solution, dried over magnesium sulfate, and concentrated to dryness under reduced pressure. Crystallization of the residue from a solution of ether and hexane gives 3 - benzyloxy - 8,14 - seco - 13 - methyl - gona - 1,3,5(10),9(11)-tetraene-14,17-dione.

EXAMPLE 6.—3-hydroxy-8,14-seco-13-methyl-gona-1,3,5(10),9(11)-tetraene-14,17-dione A mixture of 570 mg. of 1-vinyl-1,6-dihydroxy-1,2,3,4-tetrahydronaphthalene and 340 mg. of 2-methylcyclopentanedione-1,3 in four ml. of xylene and two ml. of tertiary-butanol is refluxed for two hours. The mixture is cooled and concentrated to dryness under reduced pressure. Twenty ml. of ether are added and the insoluble 2-methylcyclopentanedione-1,3 is removed by filtration. The filtrate is washed with 5% aqueous sodium bicarbonate solution, dried over magnesium sulfate and concentrated to dryness under reduced pressure. The residue is 3-hydroxy-8,14-seco - 13 - methyl - gona - 1,3,5(10),9(11) - tetraene-14,17-dione and is crystallized from a mixture of ether and hexane.

EXAMPLE 7.—3 - methoxy - 8,14 - seco - 13 - methyl-15 - carbomethoxy - gona - 1,3,5(10),9(11) - tetraene-13,17-dione A mixture of 1.02 g. of 1-vinyl-1-hydroxy-6-methoxy-1,2,3,4-tetrahydronaphthalene and 850 mg. of 2-methyl-4-carbomethoxycyclopentanedione-1,3, in four ml. of xylene and two ml. of tertiary-butanol is allowed to stand with stirring at 25° C. for twenty hours. 30 ml. of ether are then added and the precipitated 2-methyl-4-carbomethoxy-cyclopentanedione-1,3 is removed by filtration. The filtrate is washed with 5% aqueous bicarbonate solution, dried over magnesium sulfate, and concentrated to dryness under reduced pressure. The residue is 2-methoxy - 8,14 - seco - 13 - methyl - 15 - carbomethoxy-gona-1,3,5(10),9(11)-tetraene-14,17-dione.

EXAMPLE 8. — 3-methoxy-13-methyl-15-carbomethoxy gona-1,3,5(10),8,14-pentaene-17-one A solution of 580 mg. of 3-methoxy-8,14-seco-13-methyl - 15 - carbomethoxy - gona - 1,3,5(10),9(11) - tetraene-14,17-dione in fifteen ml. of methanol and 0.8 ml. of 6 N hydrochloric acid is maintained for one hour at a temperature of 25° C. Fifteen ml. of benzene are then added and the mixture is concentrated to dryness under reduced pressure. The residue is 3-methoxy-13-methyl-15 carbomethoxy - gona - 1,3,5(10),8,14 - pentaen - 17-one. The 3 - methoxy - 13 - methyl - 15 - carbomethoxy-gona-1,3,5(10),8,14-pantaen-17-one is recrystallized from a methanol-ethyl acetate solution and has a M.P. of 165–170° C.

EXAMPLE 9.—3 - methoxy - 8,14 - seco - 13 - methyl-15 - carbethoxy - gona - 1,3,5(10),9(11) - tetraene-14,17-dione A mixture of 1.02 g. of 1-vinyl-1-hydroxy-6-methoxy-1,2,3,4-tetrahydronaphthalene and 850 mg. of 2-methyl-4-carbethoxycyclopentanedione-1,3 in four ml. of xylene and 3 ml. of tertiary-butanol is maintained at a temperature of 25° C. with stirring for twenty hours. 30 ml. of ether are then added and the precipitated 2-methyl-4-carbethoxycyclopentanedione-1,3 is removed by filtration. The filtrate is washed with 5% aqueous potassium bicarbonate solution, dried over magnesium sulfate, and concentrated to dryness under reduced pressure. The residue is 3 - methoxy-8,14-seco-13-methyl - 15 - carbethoxy-gona-1,3,5(10),9(11)-tetraene-14,17-dione.

EXAMPLE 10.—3-methoxy-13-methyl-15-carbethoxy-gona-1,3,5(10),8,14-pantaen-17-one 580 mg. of 3-methoxy-8,14-seco-13-methyl-15-carbethoxy-gona-1,3,5(10),9(11)-tetraene-14,17-dione in solution in fifteen ml. of methanol and 0.8 ml. of 6 N hydrochloric acid is maintained at a temperature of 25° C. for one hour. Fifteen ml. of benzene are then added and the mixture is concentrated to dryness under reduced pressure. The residue is 3-methoxy-13-methyl-15-carbethoxy-gona-1,3,5(10),8,14-pantaen-17-one and is recrystallized from a solution of methanol and ethyl acetate. The recrystallized material has a M.P. of 161–163° C.

EXAMPLE 11.—3-methoxy-8,14-seco-13-methyl-gona-1,3,4(10),9(11)-tetraene-14,17-dione A mixture of 500 mg. of 1-vinyl-1-hydroxy-6-methoxy-1,2,3,4-tetrahydronaphthalene and 280 mg. of 2-methyl-cyclopentanedione-1,3 in three ml. of xylene and 1.5 ml. of acetic acid is refluxed for ten minutes. The reaction mixture is cooled and twenty ml. of ether are added. The precipitated 2-methylcyclopentanedione-1,3 is removed by filtration. The filtrate is washed with 5% aqueous potassium bicarbonate solution, dried over magnesium sulfate and evaporated to dryness under reduced pressure. The residue is 3-methoxy-8,14-seco-13-methyl-gona-1,3,5(10),9(11)-tetraene-14,17-dione, which is recrystallized from a mixture of ether and hexane.

EXAMPLE 12.—3-methoxy-13-methyl-gona-1,3,5(10),8,14-pentaen-17-one

A mixture of 500 mg. of 1-vinyl-1-hydroxy-6-methoxy-1,2,3,4-tetrahydronaphthalene and 280 mg. of 2-methyl-cyclopentanedione-1,3 in three ml. of xylene and 1.5 ml. of acetic acid is refluxed for two hours. The reaction mixture is cooled and 20 ml. of ether are added. The precipitated 2-methylcyclopentanedione-1,3 is removed by filtration. The filtrate is washed with 5% aqueous potassium bicarbonate solution, dried over magnesium sulfate, and concentrated to dryness under reduced pressure. The residue is 3-methoxy-13-methyl-gona-1,3,5(10),8,14-pentaen-17-one and is recrystallized from a mixture of ether and hexane. The recrystallized product has a M.P. of 108–110° C.

EXAMPLE 13.—3-methoxy-13-methyl-gona-1,3,5(10),8,14-pentaen-17-one

A mixture of 500 mg. of 1-vinyl-1-hydroxy-6-methoxy-1,2,3,4-tetrahydronaphthalene and 280 mg. of 2-methyl-cyclopentanedione-1,3 in three ml. of benzene and 1.5 ml. of acetic acid is refluxed for nine hours. The mixture is cooled to room temperature and 20 ml. of ether are added. The precipitated 2-methyl-cyclopentanedione-1,3 is removed by filtation. The filtrate is washed with 5% aqueous potassium bicarbonate solution, dried over magnesium sulfate, and concentrated to dryness under reduced pressure. The residue is 3-methoxy-13-methyl-gona-1,3,5(10),8,14-pentaen-17-one and is recrystallized from a mixture of ether and hexane.

EXAMPLE 14.—3 - methoxy - 13 - methyl - 15 - carbomethoxy - gona - 1,3,5(10),8,14 - pentaen - 17 - one and 3 - methoxy - 13 - methyl - gona - 1,3,5(10),8,14-pentaen-17-one A mixture of 306 mg. of 1-vinyl-1-hydroxy-6-methoxy-1,2,3,4-tetrahydronaphthalene and 255 mg. of 2-methyl-4-carbomethoxycyclopentanedione-1,3 to two ml. of xylene and 1 ml. of acetic acid is refluxed for two hours. The reaction mixture is cooled to room temperature and 20 ml. of ether are added. The precipitated 2-methyl-4-carbomethoxycyclopentanedione-1,3 is removed by filtration. The filtrate is washed with 5% aqueous potassium bicarbonate solution, dried over magnesium sulfate, and concentrated to dryness under reduced pressure. The residue is a mixture of 3-methoxy-13-methyl-15-carbomethoxy-gona - 1,3,5(10),8,14-pentane - 17 - one and 3 - methoxy-13-methyl-gona-1,3,5(10),8,14-pentaene-17-one. The two reaction products are separated by chromatography on Florisil.

EXAMPLE 15.—3-methoxy-8,14-seco - 13 - methyl-D-homogona-1,3,5(10),9(11) tetraene-14,17a-dione A mixture of 510 mg. of 1-vinyl-1-hydroxy-6-methoxy-1,2,3,4-tetrahydronaphthalene and 315 mg. of 2-methyl-cyclohexanedione-1,3 in three ml. of xylene and 1.5 ml. of acetic acid is refluxed for ten minutes. The reaction mixture is cooled to room temperature and 20 ml. of ether are added. The precipitated 2-methylcyclohexanedione-1,3 is removed by filtration. The filtrate is washed with 5% aqueous potassium bicarbonate, dried over magnesium sulfate, and concentrated to dryness under reduced pressure. The residue is 3-methoxy-8,14-seco-13-methyl-D-homogona-1,3,5(10),9(11)-tetraene-13,17a-dione.

EXAMPLE 16.—3-methoxy-13-methyl-D-homogona-1,3,5(10),8,14-pentaen-17a-one

A mixture of 510 mg. of 1-vinyl-1-hydroxy-6-methoxy-1,2,3,4-tetrahydronaphthalene and 315 mg. of 2-methyl-cyclohexanedione-1,3 in three ml. of xylene and 1.5 ml. of acetic acid is refluxed for seven hours. The reaction mixture is cooled to room temperature and 20 ml. of ether are added. The precipitated 2-methylcyclohexanedione-1,3 is removed by filtration. The filtrate is washed with 5% aqueous potassium bicarbonate solution, dried over magnesium sulfate, and evaporated to dryness under reduced pressure. The residue is 3-methoxy-13-methyl-D-homo-gona-1,3,5(10),8,14-pentaen-17a-one.

EXAMPLE 17.—3-methoxy-13-ethyl-gona-1,3,5(10),8,14-pentaen-17-one

A mixture of 500 mg. of 1-vinyl-1-hydroxy-6-methoxy-1,2,3,4-tetrahydronaphthalene and 310 mg. of 2-ethyl-cyclopentanedione-1,3, in two ml. of xylene and two ml. of acetic acid is refluxed for three hours. The reaction mixture is cooled to room temperature and twenty ml. of ether are added. The precipitated 2-ethylcyclopentane-dione-1,3 is removed by filtration. The filtrate is washed with 5% aqueous potassium bicarbonate solution, dried over magnesium sulfate and concentrated to dryness under reduced pressure. The residue is 3-methoxy-13-ethyl-gona-1,3,5(10),8,14-pentaen-17-one.

EXAMPLE 18.—3-hydroxy-13-methyl-gona-1,3,5(10),8,14-pentaen-17-one

A mixture of 570 mg. of 1-vinyl-1,6-dihydroxy-1,2,3,4-tetrahydronaphthalene and 340 mg. of 2-methylcyclopen-tanedione-1,3 in four ml. of xylene and two ml. of acetic acid is refluxed for 90 minutes. The reaction mixture is cooled to room temperature and twenty ml. of ether are added. The precipitated 2-methylcyclopentanedione-1,3 is removed by filtration. The filtrate is washed with 5% aqueous potassium bicarbonate solution, dried over magnesium sulfate and concentrated to dryness under reduced pressure. The residue is 3-hydroxy-13-methyl-gona-1,3,5(10),8,14-pentaen-17-one.

EXAMPLE 19.—3-methoxy-8,14-seco-13-methyl-15-carboxamido - gona - 1,3,5(10),9(11) - tetraene - 14,17 - dione A mixture of 500 mg. of 1-vinyl-1-hydroxy-6-methoxy-1,2,3,4-tetrahydronaphthalene and 380 mg. of 2-methyl-4-carboxamidocyclopentanedione-1,3 in four ml. of tertiary-butanol is refluxed for two hours. The mixture is cooled and concentrated to dryness under reduced pressure. Twenty ml. of ether are added and the insoluble 2-methyl-4-carboxamidocyclopentanedione-1,3 is removed by filtration. The filtrate is washed with 5% aqueous sodium bicarbonate solution, dried over magnesum sulfate, and concentrated to dryness under reduced pressure. The residue is 3-methoxy-8,14-seco-13-methyl-15-carboxamido-gona-1,3,5(10),9(11)-tetraene-14,17-dione.

EXAMPLE 20.—3-methoxy-13-methyl-15-carboxamido-gona-1,3,5(10),8,14-pentaen-17-one A solution of 500 mg. of 1-vinyl-1-hydroxy-6-methoxy-1,2,3,4-tetrahydronaphthalene and 380 mg. of 2-methyl-4-carboxamidocyclopentanedione-1,3 in four ml. of xylene and two ml. of acetic acid is refluxed for 90 minutes. The reaction mixture is cooled to room temperature and 20 ml. of ether are added. The precipitated 2-methyl-4-carboxamidocyclopentanedione-1,3 is removed by filtration. The filtrate is washed with 5% aqueous potassium bicarbonate solution, dried over magnesium sulfate, and concentrated to dryness under reduced pressure. The residue is 3-methoxy-13-methyl-15-carboxamido-gona-1,3,5(10),8,14-pentaen-17-one.

EXAMPLE 21.—3-methoxy-13-methyl-15-carboxamido-gona-1,3,5(10),8,14-pentaen-17-one A solution of 200 mg. of 3-methoxy-8,14-seco-13-methyl-15-carboxamido - gona - 1,3,5(10),9(11) - tetraene-14,17-dione in four ml. of benzene containing ten mg. of paratoluenesulfonic acid is refluxed for fifteen minutes. The solution is cooled and extracted with 5% aqueous potassium bicarbonate solution, dried over magnesium sulfate, and concentrated to dryness under reduced pressure. The residue is 3-methoxy-13-methyl-15-carboxami-do-gona-1,3,5(10),8,14-pentaen-17-one.

EXAMPLE 22.—3-methoxy-8,14-seco-13-methyl-gona-1,3,5(10),9(11)-tetraene-14,17-dione A mixture of 350 mg. of 1-vinyl-1-hydroxy-6-methoxy-1,2,3,4-tetrahydronaphthalene and 300 mg. of 2-methyl-cyclopentanedione-1,3 in six ml. of dioxane is refluxed for eight hours. The mixture is cooled and concentrated to dryness under reduced pressure. Twenty ml. of ether are added to the residue and the insoluble 2-methylcyclopen-tanedione-1,3 is removed by filtration. The filtrate is washed with 5% aqueous sodium bicarbonate solution, dried over magnesium sulfate, and concentrated to dryness under reduced pressure. The residue is 3-methoxy-8,14-seco - 13-methyl-gona - 1,3,5(10),9(11) - tetraene-14,17-dione and is crystallized from a mixture of ether and hexane.

EXAMPLE 23.—3-methoxy-8,14-seco-13-methyl-gona-1,3,5(10),9(11)-tetraene-14,17-dione A mixture of 500 mg. of 1-vinyl-1-hydroxy-6-methoxy-1,2,3,4-tetrahydronaphthalene and 300 mg. of 2-methyl-cyclopentanedione-1,3 is heated to 130° C. and maintained at that temperature for 60 minutes. The mixture is cooled to room temperature and 20 ml. of ether are added. The insoluble 2-methylcyclopentanedione-1,3 is removed by filtration, the filtrate is washed with 5% aqueous potassium bicarbonate solution, dried over magnesium sulfate and concentrated to dryness under reduced pressure. The residue is 3-methoxy-8,14-seco-13-methyl-gona-1,3,5(10),9(11)-tetraene-14,17-dione and is crystallized from a mixture of ether and hexane.

EXAMPLE 24.—3-methoxy-13-methyl-15-carboxy-gona,1,3,5(10),8,14-pentaen-17-one

A mixture of 400 mg. of 3-methoxy-13-methyl-15-car-bomethoxy-gona-1,3,5(10),8,14-pentaen-17-one and 400 mg. of barium hydroxide in 10 ml. of 60% aqueous methanol is refluxed under nitrogen for 90 minutes. The solution is cooled to room temperature and 50 ml. of 1 N hydrochloric acid is added. The mixture is extracted with ether. The ether extract is washed with saturated sodium chloride solution, dried over magnesium sulfate, and concentrated to dryness under reduced pressure. The residue is 3 - methoxy-13-methyl-15-carboxy-gona-1,3,5(10),8,14-pentaen-17-one.

EXAMPLE 25.—3-methoxy-13-methyl-gona-1,3,5(10),8,14-pentaen-17-one

The 3 - methoxy-13-methyl-15-carboxy-gona-1,3,5(10),8,14-pentaen-17-one, obtained by the process of Example 24, is dissolved in five ml. of acetic acid and 0.5 ml. of concentrated hydrochloric acid and warmed under nitrogen on a steam bath for forty minutes. The mixture is cooled, fifty ml. of water are added and the whole is extracted with ether. The extract is washed with 5% aqueous potassium bicarbonate solution, washed with saturated aqueous sodium chloride solution, dried over magnesium sulfate, and concentrated to dryness under reduced pressure. The residue is crystallized from methanol. The crystallized material is 3-methoxy-13-methyl-gona-1,3,5(10),8,14-pentaen-17-one.

EXAMPLE 26.—3-methoxy-8,14-seco-gona-1,3,5(10),9(11)-tetraene-14,17-dione

A mixture of 500 mg. of 1-vinyl-1-hydroxy-6-methoxy-1,2,3,4 - tetrahydronaphthalene and 400 mg. of cyclo-pentanedione-1,3 in three ml. of xylene and 1.5 ml. of tertiary-butanol is refluxed for 90 minutes. The mixture is cooled to room temperature and 20 ml. of ether are added. The precipitated cyclopentanedione-1,3 is removed by filtration. The filtrate is washed with saturated aqueous sodium chloride solution, dried over magnesium sulfate, and concentrated to dryness under reduced pressure. The residue is 3-methoxy - 8,14 - seco - gona-1,3,5(10),9(11)-tetraene-14,17-dione.

EXAMPLE 27.—3-methoxy-gona-1,3,5(10),8,14-pentaen-17-one

A mixture of 500 mg. of 1-vinyl-1-hydroxy-6-methoxy-1,2,3,4-tetrahydronaphthalene and 400 mg. of cyclopentanedione-1,3 in three ml. of xylene and 1.5 ml. of acetic acid is refluxed for two hours. The reaction mixture is cooled to room temperature and extracted with 20 ml. of ether. The precipitate of cyclopentanedione-1,3 is removed by filtration. The filtrate is washed with 5% aqueous potassium bicarbonate solution, dried over magnesium sulfate, and concentrated to dryness under reduced pressure. The residue is 3-methoxy-gona-1,3,5(10),8,14-pentaen-17-one.

Various changes and modifications may be made in carrying out the present invention without departing from the spirit and scope thereof. Insofar as these changes and modifications are within the purview of the annexed claims, they are to be considered a part of the invention.

What is claimed is:

1. A process for the preparation of compounds of the general formula:

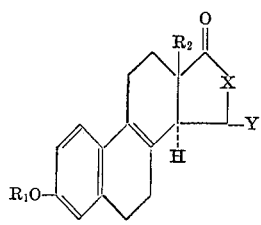

wherein $R_1$ is selected from the class consisting of hydrogen, lower alkyl and aralkyl, $R_2$ is selected from the class consisting of hydrogen and lower alkyl, X is a bivalent saturated aliphatic radical having at least one but not more than two carbon atoms, and Y is selected from the class consisting of hydrogen, carbalkoxy, carbaralkoxy and carboxamido groups, Y being hydrogen if X is ethylene, which comprises the steps of reacting under acidic conditions at a pH from about 3 to about 6 a compound of the general formula:

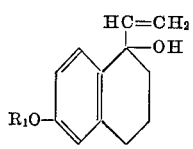

wherein $R_1$ has the same significance as hereinabove, with a compound of the general formula:

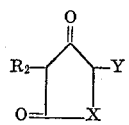

wherein $R_2$, X and Y have the same significance as hereinabove, to provide a tetraene-dione compound of the general formula:

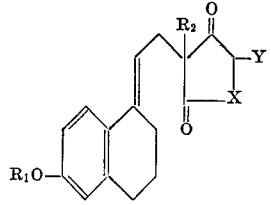

wherein $R_1$, $R_2$, X and Y have the same significance as hereinabove, reacting a solution of the tetraene-dione compound in an inert organic solvent with a lower aliphatic acid to provide a pentaene compound of the general formula:

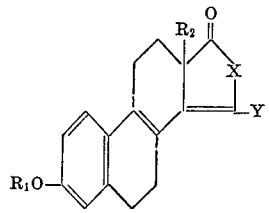

wherein $R_1$, $R_2$, X and Y have the same significance as hereinabove, and hydrogenating a solution of the pentaene compound in an organic solvent in the presence of palladised calcium carbonate.

2. A process for the preparation of compounds of the general formula:

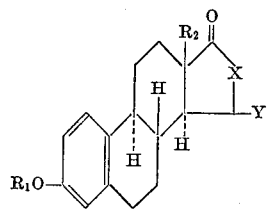

wherein $R_1$ is selected from the class consisting of hydrogen, lower alkyl and aralkyl, $R_2$ is selected from the class consisting of hydrogen and lower alkyl, X is a bivalent saturated aliphatic radical having at least one but not more than two carbon atoms, and Y is selected from the class consisting of hydrogen, carbalkoxy, carbaralkoxy and carboxamido groups, Y being hydrogen if X is ethylene, which comprises the steps of reacting under acidic conditions at a pH from about 3 to about 6 a compound of the general formula:

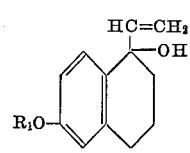

wherein $R_1$ has the same significance as hereinabove, with a compound of the general formula:

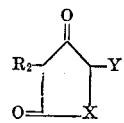

wherein $R_2$, X and Y have the same significance as hereinabove, to provide a tetraene-dione compound of the general formula:

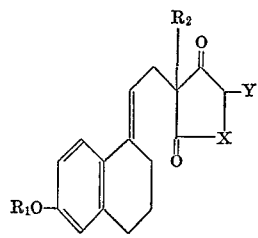

wherein $R_1$, $R_2$, X and Y have the same significance as hereinabove, reacting a solution of the tetraene-dione compound in an inert organic solvent with a lower aliphatic acid to provide a pentaene compound of the general formula:

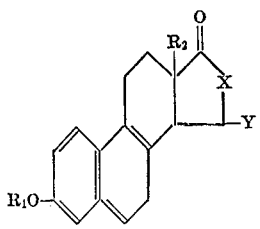

wherein $R_1$, $R_2$, X and Y have the same significance as hereinabove, hydrogenating a solution of the pentaene compound in an organic solvent in the presence of palladised calcium carbonate to provide a tetraene-one compound of the general formula:

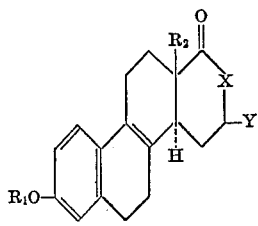

wherein $R_1$, $R_2$, X and Y have the same significance as above, and reacting a solution of the tetraene-one in an organic solvent with a solution of potassium in liquid ammonia.

3. A compound of the general formula:

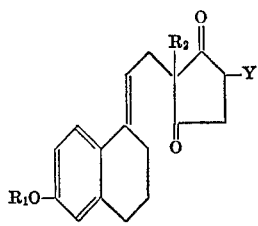

wherein $R_1$ is selected from the class consisting of hydrogen, lower alkyl and aralkyl, $R_2$ is selected from the class consisting of hydrogen and lower alkyl, and Y is selected from the class consisting of carbalkoxy, carbaralkoxy, carboxamido and carboxy groups.

4. A compound of the general formula:

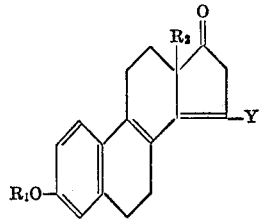

wherein $R_1$ is selected from the class consisting of hydrogen, lower alkyl and aralkyl, $R_2$ is selected from the class consisting of hydrogen and lower alkyl, and Y is selected from the class consisting of carbalkoxy, carbaralkoxy, carboxamido, and carboxy groups.

5. A compound of the general formula:

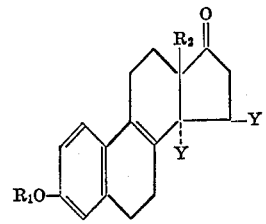

wherein $R_1$ is selected from the class consisting of hydrogen, lower alkyl and aralkyl, $R_2$ is selected from the class consisting of hydrogen and lower aralkyl, and Y is selected from the class consisting of carbalkoxy, carbaralkoxy, carboxamido and carboxy groups.

6. A compound of the general formula:

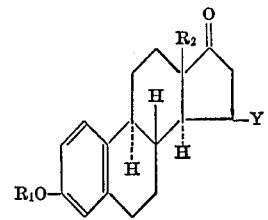

wherein $R_1$ is selected from the class consisting of hydrogen, lower alkyl and aralkyl, $R_2$ is selected from the class consisting of hydrogen and lower aralkyl, and Y is selected from the class consisting of carbalkoxy, carbaralkoxy, carboxamido and carboxy groups.

References Cited

Miki et al.: Proc. Chem. Soc. (1963), p. 139.

ELBERT L. ROBERTS, *Primary Examiner.*

U.S. Cl. X.R.

260—397.4, 397.45, 590, 999